United States Patent [19]

Shinotuka et al.

[11] Patent Number: 5,641,903
[45] Date of Patent: Jun. 24, 1997

[54] GAS RATE SENSOR FOR DETECTING HORIZONTAL ANGULAR VELOCITY

[75] Inventors: Sukeyuki Shinotuka; Takashi Hosoi; Hiroshi Yamakawa, all of Wako, Japan

[73] Assignee: Honda Giken Kogyo Kabushiki Kaisha, Tokyo, Japan

[21] Appl. No.: 384,910

[22] Filed: Feb. 7, 1995

[30] Foreign Application Priority Data

Feb. 7, 1994 [JP] Japan .................. 6-013546

[51] Int. Cl.$^6$ .................................................. G01P 9/00
[52] U.S. Cl. ........................ 73/204.18; 73/504.03; 73/504.06
[58] Field of Search .............. 73/504.03, 504.05, 73/504.06, 514.09, 204.18

[56] References Cited

U.S. PATENT DOCUMENTS

| | | | |
|---|---|---|---|
| 3,631,729 | 1/1972 | Moore | 73/504.06 |
| 3,635,075 | 1/1972 | Schuemann | 73/504.06 |
| 4,026,159 | 5/1977 | Isakson et al. | 73/504.06 |
| 4,147,063 | 4/1979 | Bower et al. | 83/504 |
| 4,156,364 | 5/1979 | Hill | 73/194 F |
| 4,254,659 | 3/1981 | Benedetto et al. | 73/516 LM |
| 4,348,900 | 9/1982 | Takahashi et al. | 73/505 |
| 4,407,161 | 10/1983 | Ferrar | 73/505 |
| 4,408,490 | 10/1983 | Takahashi et al. | 73/497 |
| 4,542,650 | 9/1985 | Renken et al. | 73/204 |
| 4,584,878 | 4/1986 | Katsuno | 73/497 |
| 4,592,232 | 6/1986 | Moffatt et al. | 73/505 |
| 4,594,894 | 6/1986 | Moffatt | 73/515 |
| 4,717,891 | 1/1988 | Ichise et al. | 331/17 |
| 4,930,349 | 6/1990 | Takahashi et al. | 73/497 |
| 4,951,507 | 8/1990 | Takahashi et al. | 73/497 |
| 5,012,676 | 5/1991 | Takahashi et al. | 73/497 |
| 5,107,707 | 4/1992 | Takahashi et al. | 73/516 |
| 5,270,960 | 12/1993 | Ikegami et al. | 364/571.03 |
| 5,385,046 | 1/1995 | Yamakawa et al. | 73/516 |
| 5,438,871 | 8/1995 | Hosoi et al. | 73/504.05 |
| 5,476,820 | 12/1995 | Fueki et al. | 437/250 |

FOREIGN PATENT DOCUMENTS

| | | | |
|---|---|---|---|
| 052020 | 5/1982 | European Pat. Off. | |
| 363081269 | 4/1988 | Japan | 73/504.05 |
| 363293471 | 11/1988 | Japan | 73/504.05 |
| 36293472 | 11/1988 | Japan | 73/504.05 |
| 63-298068 | 12/1988 | Japan | |
| 363398066 | 12/1988 | Japan | 73/504.05 |
| 363298067 | 12/1988 | Japan | 73/504.05 |
| WO8802819 | 4/1988 | WIPO | |

OTHER PUBLICATIONS

European Search Report.
Nishio et al., U.S. Application Serial No. 08/409,197 filed Mar. 23, 1995.
Nishio et al., U.S. Application Serial No. 08/408,996 filed Mar. 23, 1995.
Hosoi et al., U.S. Application Serial No. 08/376,155 filed Jan. 20, 1995.
3 Doi, U.S. Application Serial No. 08/390,875 filed Feb. 17, 1995.

*Primary Examiner*—Richard Chilcot
*Assistant Examiner*—Paul D. Amrozowicz
*Attorney, Agent, or Firm*—Lyon & Lyon

[57] ABSTRACT

A gas rate sensor comprising a sensor body, a pump control device and a resistive bridge circuit. Semiconductor substrates are accurately photoengraved by semiconductor fabrication techniques to integrally form a pair of heat-generating and heat-sensitive resistive elements, a gas passageway, a pump casing, and other components in the sensor body. The pump control device controls a piezoelectric pump for creating a gas flow. The resistive bridge circuit is composed of the aforementioned resistive elements and a pair of reference resistors. The pump control device sets the gas flow rate to a given value to detect only the angular velocity acting in the direction of yaw. The angular velocity can be detected accurately with high sensitivity.

18 Claims, 3 Drawing Sheets

GAS RATE SENSOR FOR DETECTING HORIZONTAL ANGULAR VELOCITY

BACKGROUND OF THE INVENTION

1. Field of the Invention

The present invention relates to a gas rate sensor for detecting an angular velocity acting in the horizontal direction (in the direction of yaw) and more particularly, to a gas rate sensor which responds neither to gravitational acceleration corresponding to inclination in the direction of roll nor to unwanted acceleration acting in the direction of yaw.

2. Description of the Related Art

In the gas rate sensor disclosed in Japanese Patent Laid-Open No. 29858/1991, heat wires (heat-sensitive resistive elements), a gas passage, a nozzle, and other components are photoengraved in semiconductor substrates by semiconductor fabrication techniques. A gas flow is created by a piezoelectric pump composed of a piezoelectric device. Variations in the resistance values of the heat wires are detected by utilizing deflection of the gas flow striking the heat wires (heat-sensitive resistive elements), and the angular velocity acting on the gas rate sensor in the horizontal direction (in the direction of yaw) is detected.

Since the prior art gas rate sensor makes use of photoengraving techniques of semiconductor fabrication processes, the gas rate sensor can be made small in size. Also, the heat-sensitive characteristics differ only slightly between the heat wires. Hence, this kind of gas rate sensor is adapted for mass production. In addition, the gas rate sensor is excellent in ability to detect angular velocities. However, in the prior art gas rate sensor, the heat wires are spaced closely from each other to make the sensor small, utilizing photoengraving of semiconductor fabrication techniques. Therefore, the sensitivity with which temperature is detected decreases.

In the prior art gas rate sensor, a pressurized heavy gas is sealed in the sensor to prevent the sensitivity from deteriorating. Also, a large temperature distribution gradient is created between the heat wires. In this way, the sensitivity is improved.

In the prior art gas rate sensor, where the pressurized heavy gas is used as described above, unwanted gravitational acceleration corresponding to inclination in the direction of roll and even acceleration acting in the direction of yaw are detected, in addition to the required detection of angular velocity in the horizontal direction (in the direction of yaw).

Especially, where the gas rate sensor is installed on a vehicle and rotates while tilting, the output from the prior art gas rate sensor is the resultant of (1) angular velocity in the direction of gyration, (2) gravitational acceleration (G) corresponding to inclination, and (3) acceleration in the horizontal direction (in the direction of yaw). Consequently, the angular velocity cannot be detected precisely.

SUMMARY OF THE INVENTION

The present invention provides a gas rate sensor comprising a sensor body, a container in which the sensor body is housed, a detection means for detecting an angular velocity in the direction of yaw, and a pump control means for controlling the operation of a piezoelectric pump to adjust the gas flow rate. The sensor body comprises semiconductor substrates on which a pair of heat-generating heat-sensitive resistive elements are photoengraved by semiconductor fabrication technology. The heat-sensitive elements are connected into a substrate bridge. The sensor body forms a pump casing in which a gas passageway is formed. A piezoelectric pump is mounted in the pump casing. The container is sealed with a pressurized gas. The pump control means controls the operation of the piezoelectric pump to adjust the gas flow rate. By adjusting the gas flow rate, only the angular velocity acting in the direction of yaw can be detected. In particular, variations in the resistances of the heat-sensitive elements caused by deflection of the gas flow are electrically detected. Thus, the angular velocity acting in the direction of yaw can be detected with high accuracy.

In one feature of the present invention, a resistive bridge circuit comprises the aforementioned heat-generating heat-sensitive resistive elements, together with a pair of reference resistors. The angular velocity in the direction of yaw can be detected with high sensitivity in terms of an electrical amount corresponding to the sum of the amounts of change of the resistances of the heat-sensitive elements.

As described above, the sensor body is fabricated by photoengraving techniques which are normally used in semiconductor fabrication processes. Also, the resistive bridge circuit is provided. Therefore, the resistances in the sensor body can be set to desired values accurately and placed in position accurately. The characteristics of the two heat-sensitive elements can be matched well. Furthermore, the angular velocity in the direction of yaw can be detected with high sensitivity by the resistive bridge circuit.

In addition, the pump control means is provided which controls the piezoelectric pump to adjust the gas flow rate. Consequently, the gas flow rate can be set to such a value that only the angular velocity in the direction of yaw is detected.

Accordingly, the present invention solves the problem with the prior art gas rate sensor. That is, the prior art sensor detects unwanted gravitational acceleration corresponding to tilt in the direction of roll and unwanted acceleration in the direction of yaw, in addition to angular velocity in the direction of yaw. A gas rate sensor acting to detect only an angular velocity in the direction of yaw with high sensitivity and with high accuracy can be accomplished according to the present invention.

Other objects and features of the invention will appear in the course of the description thereof, which follows.

DETAILED DESCRIPTION OF THE PREFERRED EMBODIMENT

A preferred embodiment of the invention is hereinafter described with reference to the accompanying drawings.

Figure 1:
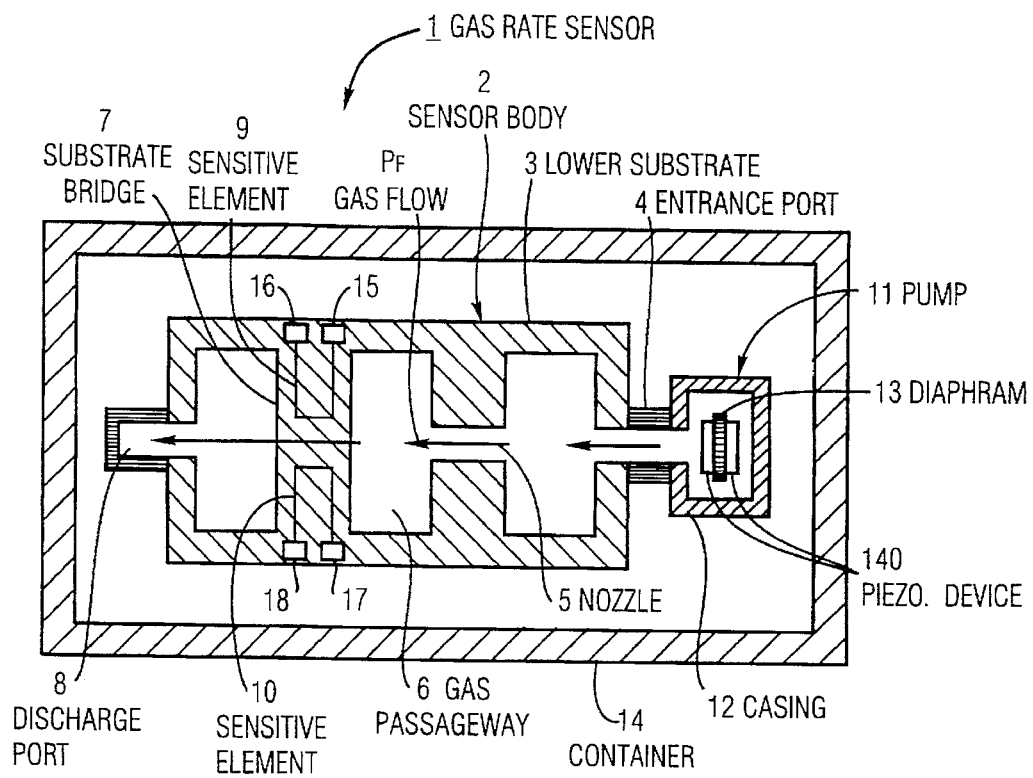
FIG. 1 is a cross-sectional view of one main portion of a gas rate sensor according to the present invention.
Figure 2:
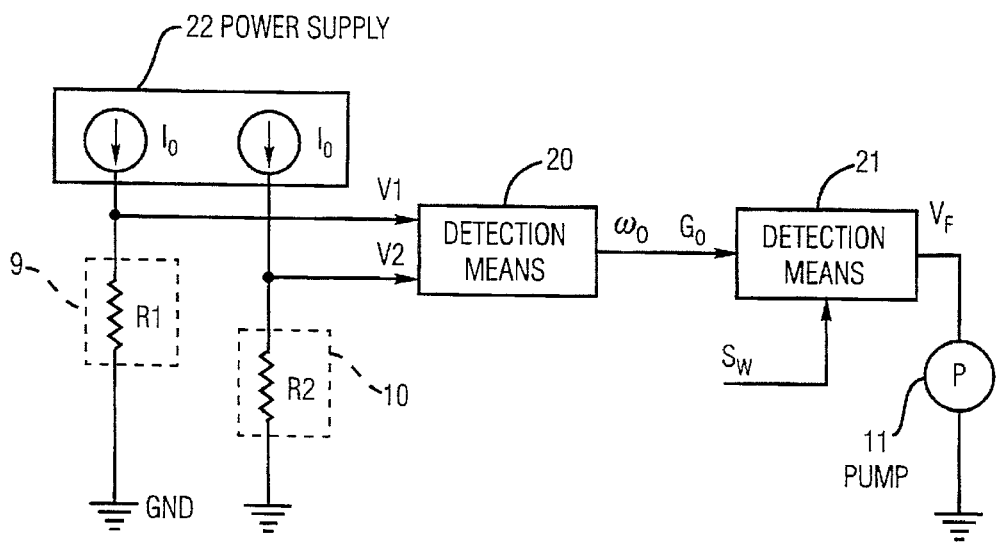
FIG. 2 is a block diagram of main portions of a gas rate sensor according to the invention.

FIG. 1 is a cross-sectional view of one main portion of a gas rate sensor embodying the concept of the present invention. FIG. 2 is a block diagram of other main portions of the novel gas rate sensor.

The gas rate sensor is generally indicated by reference numeral 1 in FIG. 1 and comprises a sensor body 2, a container 14 in which the sensor body 2 is housed, a detection means 20 (FIG. 2), and a pump control means 21 (FIG. 2). The sensor body 2 includes a lower semiconductor substrate 3, an upper semiconductor substrate (not shown), and a piezoelectric pump 11 consisting of a piezoelectric device 140. The upper and lower substrates are in intimate contact with each other to form a semiconductor casing. A gas such as nitrogen gas is sealed in the container 14.

Referring again to FIG. 1, the lower semiconductor substrate 3 is fabricated by forming an entrance port 4, a nozzle 5, a gas passageway 6, a substrate bridge 7 suspended in the gas passageway 6, and a discharge port 8 in a silicon wafer, for example, by photoengraving techniques for semiconductor fabrication processes. The upper semiconductor substrate (not shown) is provided with similar spaces at positions corresponding to the entrance port 4, the nozzle 5, the gas passageway 6, and the discharge port 8, excluding the portion corresponding to the substrate bridge 7.

The heat-generating and heat-sensitive resistive elements 9 and 10 are formed by depositing platinum, tungsten, or other metal material on the substrate bridge 7 in the lower semiconductor substrate 3 and etching desired patterns into the metallization layer. Pads 15–18 used for connection with an external circuit are connected to both ends of the resistive heat-sensitive elements 9 and 10.

The heat-sensitive elements 9 and 10 are placed opposite to each other on the same plane of the substrate bridge 7, and the upper semiconductor substrate (not shown) is coupled to the lower semiconductor substrate 3 to form the sensor body 2. The heat-sensitive elements 9 and 10 are located in the center of the gas passageway 6 in the heighth direction (perpendicular to the sheet of FIG. 1), the gas passageway 6 being formed by the upper and lower semiconductor substrates.

The nozzle 5 is formed by etching a thin groove in the surface of the lower semiconductor substrate 3 and in the surface of the upper semiconductor substrate. A gas flow created by the piezoelectric pump 11 is restricted into a thin gas flow $P_F$ by the nozzle 5. The gas flow $P_F$ passes across the midway point between the heat-sensitive elements 9 and 10 which are positioned opposite to each other on the substrate bridge 7.

The piezoelectric pump 11 is fabricated by holding both top and bottom ends of a diaphragm 13 inside a pump casing 12 and sticking the piezoelectric device 140 on both side surfaces of the diaphragm 13.

When a voltage is applied across the piezoelectric device 140, vibrations corresponding to the voltage are produced. The vibrations are transmitted to the gas such as nitrogen via the diaphragm 13, thus producing the gas flow.

The gas flow generated by the piezoelectric pump 11 is supplied through the entrance port 4 into the casing formed by both semiconductor substrates. The supplied gas is converted into the thin cylindrical gas flow $P_F$ by the nozzle 5. Thus, the gas is supplied along the center in the space between the heat-sensitive elements 9 and 10.

The discharge port 8 in the sensor body 2 is connected with the pump casing 12 of the piezoelectric pump 11 by a conduit (not shown). On reaching the discharge port 8, the gas flow $P_F$ is fed back to the pump casing 12 via the conduit.

The piezoelectric pump 11 may be replaced by a pump using an axial fan.

Referring now to FIG. 2, the detection means 20 has a memory consisting of a ROM, for example. A power supply portion 22 (e.g., a current source $I_0$) activates resistors R1 and R2 included in the resistive heat-sensitive elements 9 and 10, respectively. The detection means 20 receives a voltage V1 ($=R1*I_0$) developed across the resistor R1 and a voltage V2 ($=R2*I_0$) developed across the resistor R2 according to the angular velocity in the horizontal direction (i.e, in the direction of yaw), and delivers to control means 21 a signal $\omega_0$ indicating a previously stored value of angular velocity in response to the output difference (V1–V2).

The pump control means 21 acts to reset the detected acceleration (G) in the direction of roll (i.e., tilt from the vertical direction) to null. The pump control means 21 is composed of a comparator portion, a pump voltage output portion, a pump voltage setting portion, and other portions. To obtain the correct gas flow $P_F$ for nullifying unwanted acceleration effects, the pump control means 21 controls the supply of pump voltage $V_P$ and therefore the gas flow $P_F$ created by the piezoelectric pump 11 in such a way that when the sensor is tilted in the roll direction, the heat-sensitive elements 9 and 10 dissipate the same amount of heat and therefore the acceleration signal $G_0$ from the detection means 20 assumes a value of 0. The amount of heat dissipated means the amount of heat carried away (or amount of cooling) from the heat-sensitive elements 9 and 10 by the gas flow $P_F$.

The pump control means 21 is started in such a way that when the gas rate sensor 1 is first set or reset, the sensor body 2 of the gas rate sensor 1 assumes a vertical posture (e.g. with element 9 above element 10). For example, the pump control means 21 is started in response to switching information $S_W$ from an external setting switch or the like.

Since the novel gas rate sensor 1 detects only the angular velocity $\omega_0$ in the horizontal direction, or in the direction of yaw, the pump control means 21 is not required to be readjusted except when the pump driving voltage $V_P$ is first set or reset.

The operation of the gas rate sensor 1 will now be described. When the sensor body 2 of the gas rate sensor 1 is in a horizontal attitude and at rest, the pump control means 21 applies the pump voltage $V_P$ to drive the piezoelectric pump 11. The gas flow $P_F$ of nitrogen created by the piezoelectric pump 11 passes through the nozzle 5 and the gas passageway 6. Then, the gas flows through the center of the spacing between the heat-sensitive elements 9 and 10 and strikes them uniformly.

The heat-sensitive elements 9 and 10 are supplied with electrical current $I_0$ from the power supply portion 22 and generate heat, so that the heat-sensitive elements 9 and 10 are heated to a high temperature. If the heat-sensitive elements 9 and 10 are designed to have the same characteristics, the amount of heat and the amount of heat dissipated by the gas flow $P_F$ do not differ between these two heat-sensitive elements. The resistors R1 and R2 have the same resistance value.

The resistances of the resistors R1 and R2 of the heat-sensitive elements 9 and 10, respectively, have a positive temperature coefficient. That is, as the temperature rises, their resistance increases. Accordingly, the heat-sensitive element outputs V1 and V2 are equal (V1=V2). The output difference (V1–V2) applied to the detection means 20 is zero. Also, the angular velocity signal $\omega_0$ from the detection means 20 is $\omega_0$. Hence, an angular velocity is not detected.

Under this condition, if the gas rate sensor 1 is rotated horizontally (e.g., to the right with respect to the gas flow $P_F$, in FIG. 1) at a given angular velocity, then the gas flow $P_F$ is deflected from the position located midway between the heat-sensitive elements 9 and 10 to the left toward the heat-sensitive element 10 by the action of the angular velocity. The heat-sensitive element 10 experiences stronger gas flow $P_F$ and dissipates a larger amount of heat, while the heat-sensitive element 9 undergoes weaker gas flow $P_F$ and dissipates a smaller amount of heat. As a consequence, the resistance of the resistor R2 decreases, whereas the resistance of the resistor R1 increases.

Therefore, the heat-sensitive element output V1 increases but the heat-sensitive element output V2 decreases (V1>V2). The output difference (V1−V2) applied to the detection means 20 assumes a positive value, so that the detection means 20 produces an angular velocity signal $\omega_0$ corresponding to the output difference (V1−V2).

Conversely, if the sensor body 2 rotates to the left at a given angular velocity, the gas flow $P_F$ is deflected to the right toward the heat-sensitive element 9, the resistance of the resistor R1 decreases, and the resistance of the resistor R2 increases (V1<V2), The output difference (V1−V2) applied to the detection means 20 becomes negative. The detection means 20 produces the angular velocity signal $\omega_0$ corresponding to the output difference (V1−V2).

In this way, the direction of gyration (i.e., the direction in which the angular velocity is generated) can be known from the sign (plus or minus) of the output difference (V1−V2). The magnitude of the angular velocity can be determined from the absolute value of the output difference (V1−V2).

For determining the effect of tilting (rolling) movement of the gas rate sensor 1, it is assumed that the detection means produces an output $V_0$ in response to the gas flow $P_F$ when the sensor body 2 of the gas rate sensor 1 is in a vertically tilted attitude (e.g., the heat-sensitive element 9 is above the heat-sensitive element 10 and gas flow $P_F$ is still horizontal) and at rest.

Figure 3:
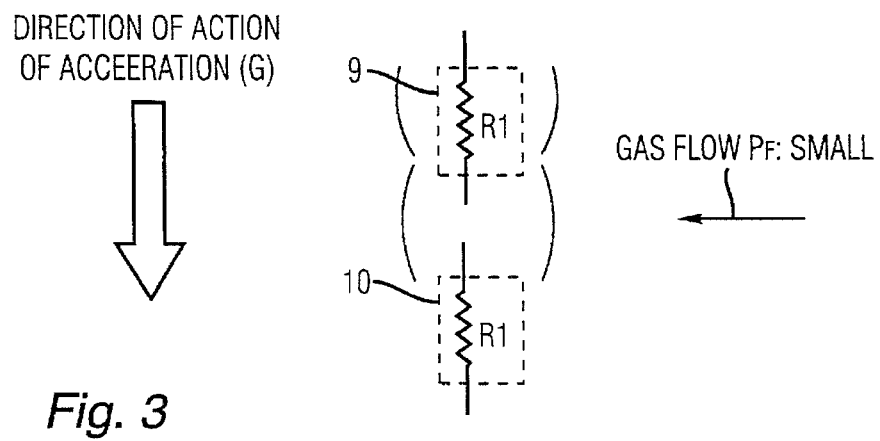
FIG. 3 is a diagram illustrating gas flow $P_F$ in a gas rate sensor according to the invention and thermal convection around heat-generating heat-sensitive resistive elements, and in which the rate of the gas flow is small.

FIG. 3 illustrates the gas flow $P_F$ in the novel gas rate sensor and the thermal convection around the heat-generating heat-sensitive resistive elements. In FIG. 3, it is assumed that the gas flow $P_F$ is small. Heat generated by the heat-sensitive elements 9 and 10 flows in the upward direction opposite to the direction of action of the gravitational acceleration (G) because the heated gas becomes less dense and rises. The gas flow $P_F$ is assumed to be so small as to have little or no effect on the heated gas rising from heat-sensitive element 10. Therefore, the heat-sensitive element 9 is heated to a higher temperature than the heat-sensitive element 10. The resistance of the resistor R1 increases, while the resistance of the resistor R2 decreases (R1>R2). This creates an unwanted error in the sensor for detecting the actual angular velocity in the yaw direction.

Figure 4:
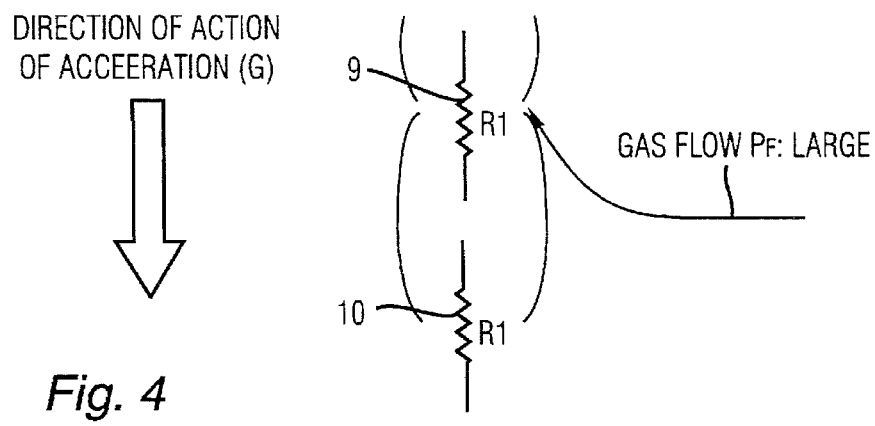
FIG. 4 is a diagram similar to FIG. 3, but in which the rate of the gas flow is large.

FIG. 4 illustrates the gas flow $P_F$ in this novel gas rate sensor and the thermal convection around the heat-generating heat-sensitive resistive elements. In FIG. 4, it is assumed that the gas flow $P_F$ is large. The convective gas flow from the heat-sensitive elements 9 and 10 is the same as in the case of FIG. 3. However, the gas flow $P_F$ tends to be shifted toward the heat-sensitive element 9, or upward, as the gas flow $P_F$ increases, and the amount of heat dissipated by the heat-sensitive element 9 increases gradually thereby developing a condition where R1 (R2, i.e. the opposite of the small gas flow condition.

If the gas flow $P_F$ is set to a given gas flow rate $P_{F0}$, then the amount of heat dissipated from the heat-sensitive element 9 is equal to the amount of heat dissipated from the heat-sensitive element 10 and the resistance R1 of the heat-sensitive element 9 becomes equal to the resistance R2 of the heat-sensitive element 10 (R1=R2).

If the gas flow $P_F$ is increased further ($P_F$>$P_{F0}$), then the amount of heat dissipated from the heat-sensitive element 9 is greater than the amount of heat dissipated from the heat-sensitive element 10 and the resistance R1 becomes smaller than the resistance R2 (R1<R2).

Figure 5:
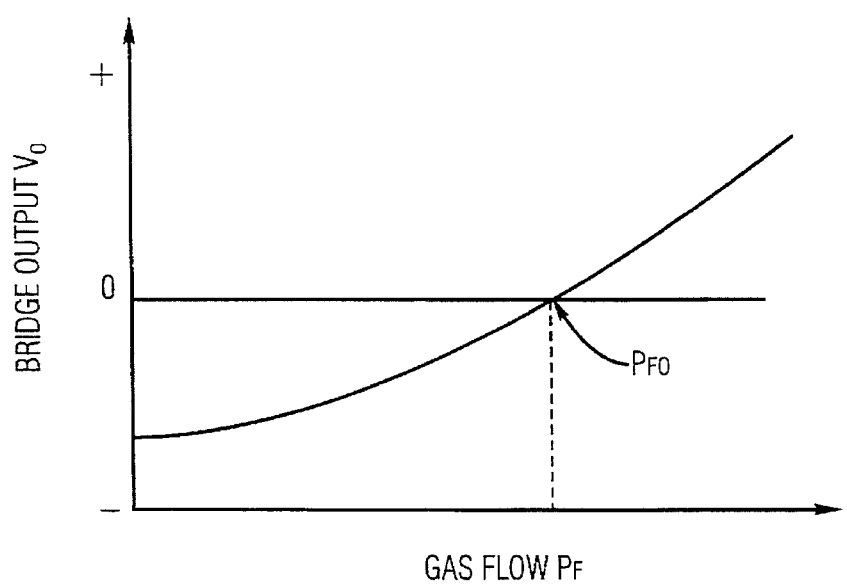
FIG. 5 is a graph illustrating the relation of the output $V_O$ from a resistive bridge circuit in a gas rate sensor according to the invention to gas flow $P_F$.

FIG. 5 illustrates the relation of a bridge circuit output $V_0$ to the gas flow $P_F$ in the gas rate sensor. In FIG. 5, the relations illustrated in FIGS. 3 and 4 are expressed in terms of the gas flow $P_F$ and the output $V_0$ from a resistive bridge circuit 24 shown in FIG. 6. In regions where the gas flow $P_F$ is small, the resistance R1 of the heat-sensitive element 9 is larger than the resistance R2 of the heat-sensitive element 10 (R1>R2) and the output $V_0$ from the resistive bridge circuit 24 is negative. The bridge circuit 24 comprises resistances r1 and r2 of reference resistors 25 and 26, respectively, along with the resistances R1 and R2.

As the gas flow $P_F$ is increased, the output $V_0$ from the resistive bridge circuit 24 increases. When the gas flow $P_F$ is equal to the given gas flow $P_{F0}$, the resistances R1 and R2 are equal. Under this condition, the output $V_0$ is zero. If the gas flow $P_F$ is increased further ($P_F$>$P_{F0}$), then the output $V_0$ becomes positive (+).

Thus, by setting the gas flow $P_F$ to the given gas flow rate $P_{F0}$, the gas rate sensor 1 does not detect the acceleration (G) in a vertically inclined state but detects only a horizontal angular velocity.

In FIG. 5, the relation between the bridge circuit output $V_0$ and the gas flow rate $P_{F0}$ is illustrated under the condition that the gas rate sensor 1 is placed vertical (at a tilt angle of 90° with heat-sensitive element 9 directly above heat-sensitive element 10). Experimentation has shown that the relation between the bridge circuit output $V_0$ and the gas flow rate $P_{F0}$ remains unchanged even if the tilt angle is set to any desired value.

Figure 6:
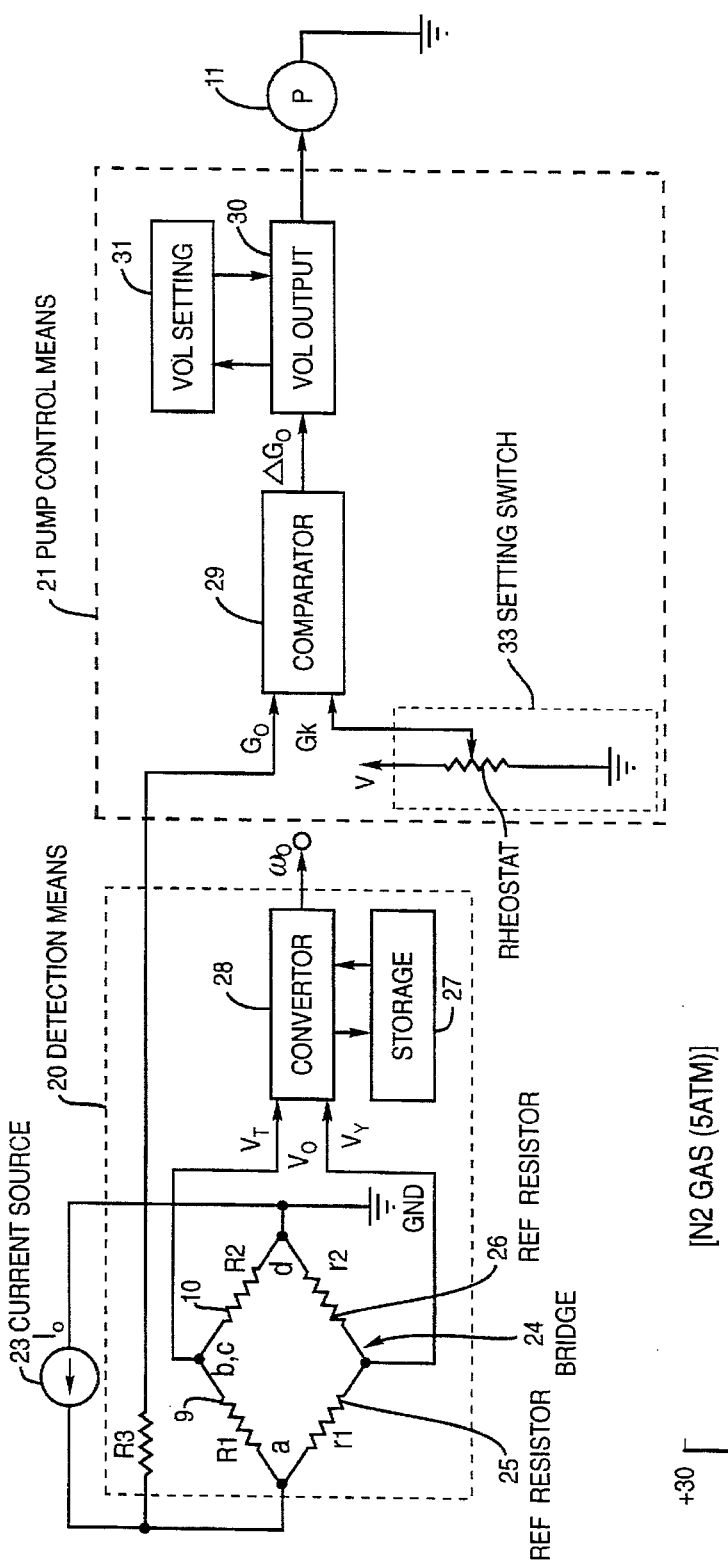
FIG. 6 is a block diagram of main portions of a detection means and a pump control means incorporated in a gas rate sensor according to the invention.

FIG. 6 is a block diagram of main portions of the detection means and the pump control means of the novel gas rate sensor. In FIG. 6, the detection means 20 is equipped with the resistive bridge circuit 24, an angular velocity converter portion 27, and an angular velocity storage portion 28 to detect angular velocity $\omega_0$ in the horizontal direction. The bridge circuit 24 is driven by an external current source 23.

The pump control means 21 comprises a comparator portion 29, a pump voltage output portion 30, and a pump voltage setting means 31 to apply the optimum pump voltage $V_P$ to the piezoelectric pump 11 in such a way that the gas flow $P_{F0}$ does not permit detection of the acceleration (G) in the direction of roll. The pump control means 21 is activated by a setting switch 33.

In the resistive bridge circuit 24, the resistances R1 and R2 of the heat-sensitive elements 9 and 10, respectively, are connected in series. This series combination of the resistances R1 and R2 is connected in parallel with the series combination of the reference resistances r1 and r2.

The current source 23 (current source $I_0$) is connected between the resistances R1 and R2 of the bridge circuit 24. Voltage $V_x$ is developed at the junction of the resistances R1 and R2. Voltage $V_y$ is produced at the junction of the resistances r1 and r2. The bridge circuit output $V_0 (=V_x-V_y)$ is taken between the voltages $V_x$ and $V_y$.

The angular velocity converter portion 27 reads angular velocity $\omega_0$ from the angular velocity storage portion 28 and produces an angular velocity signal $\omega_0$ according to the bridge circuit output $V_0$. The angular velocity storage portion 28 is composed of a ROM or other memory. Data about the relation between the bridge circuit output $V_0$ and the angular velocity $\omega_0$ is stored in the storage portion 28, the data being previously found experimentally or theoretically.

In this way, the gas rate sensor 1 is equipped with the detection means 20 which produces the angular velocity signal $\omega_0$ corresponding to the output $V_0$. Therefore, where the sensor is installed on an object rotating in the horizontal direction (i.e. in the direction of yaw), the angular velocity can be detected.

The pump control means 21 is started, and outputs an initial pump voltage $V_P$, when the gas rate sensor 1 is first set or reset. For example, the gas rate sensor 1 is placed vertically in such a way that the heat-generating and heat-sensitive resistive element 9 shown in FIG. 1 is located on the upper side above heat-sensitive resistance element 10.

The comparator portion 29 is composed of a comparator or other comparison circuit. The comparator portion 29 compares an acceleration signal $G_0$ produced from the detection means 20 with a reference acceleration $G_K$ and supplies a differential signal $\Delta G_0 (=G_0 - G_K)$ to the pump voltage output portion 30. The reference acceleration $G_K$ is supplied by a setting switch 33 that includes an adjustable rheostat between a voltage V and ground.

The pump voltage output portion 30 reads a given correcting voltage value $\Delta V_P$, corresponding to the differential signal $\Delta G_0$ in response to the differential signal $\Delta G_0$ from the pump voltage setting portion 31 and produces the pump voltage $V_P$ which is the sum of the aforementioned initial pump voltage $V_P$ and the read correcting voltage value $\Delta V_P$ to drive the piezoelectric pump 11.

The pump voltage setting portion 31 consists of a ROM or other memory. The given correcting voltage value $\Delta V_P$ corresponding to the differential signal $\Delta G_0$ has been previously stored in the pump voltage setting portion 31.

The value of $G_K$ can be varied by a rheostat in switch 33, and, by varying $G_K$ when the sensor is titled so that the sensor output $\omega_o$ is zero, the correct pump voltage for the correct gas flow rate can be set.

Therefore, when the sensor is first set or reset, an adjustment is made so that the pump voltage $V_P$ from the pump control means 21 makes null the acceleration signal $\omega_o$. The pump voltage $V_P$ obtained when the acceleration signal $\omega_o$ is null is stored in the pump voltage setting portion 31 of the pump control means 21. The piezoelectric pump 11 is driven with the stored pump voltage $V_P$ until the next setting, or resetting, is done.

In the present example, the pump control means 21 automatically inhibits detection of unwanted acceleration such a roll when the gas rate sensor 1 is first set or reset. The pump control means 21 can be made up of any pump voltage-varying means such as a variable resistor or the like. The pump voltage $V_P$ can be manually adjusted while monitoring the acceleration signal $G_o$ from the detection means 20. The pump voltage $V_P$ can be previously set in such a manner that the acceleration signal $G_0$ is zero when the sensor is initially set.

The gas flow rate $P_{FO}$ which makes null the acceleration signal $G_0$ detected by the gas rate sensor 1 is essentially determined by the pressure and temperature of a gas such as pressurized nitrogen gas. Therefore, when the sensor is first set or reset, an adjustment is made so that the pump voltage $V_P$ from the pump control means 21 makes null the acceleration signal $G_0$. The pump voltage $V_P$ obtained when the acceleration signal $G_0$ is null is stored in the pump voltage setting portion 31 of the pump control means 21. The piezoelectric pump 11 is driven with the stored pump voltage $V_P$ until the next setting, or resetting, is done.

Where the pressure of the pressurized nitrogen or other gas varies with varying temperature, the pump control means 21 monitors the pump voltage $V_P$ and the pump current with which the piezoelectric pump 11 is driven. PLL (Phase locked loop) control is provided in such a way that the phase assumes a given value according to the varying temperature. The frequency of the pump voltage $V_P$ is varied to automatically compensate for temperature variations.

Figure 7:
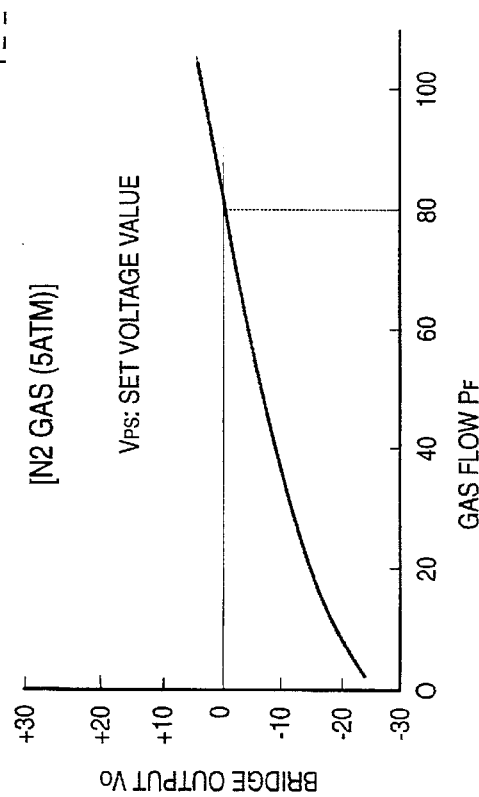
FIG. 7 is a graph illustrating the characteristic of a gas rate sensor according to the invention, the sensor using a pump control means.

FIG. 7 is a graph illustrating the characteristics of one example of the pump control means of the novel gas rate sensor. It was sealed with nitrogen gas at 5 atm. The tilt angle of the gas rate sensor 1 was 90°. The ambient temperature was 25° C. The pump voltage $V_P$ of the piezoelectric pump 11 was varied to change the gas flow $P_F$. The output $V_0$ from the resistive bridge circuit 24 responding to the gas flow $P_F$ was measured. The results are shown in FIG. 7.

When the gas flow $P_F$ was set to the given flow rate $P_{FO}(=80$ SCCM), $V_0=0$ the vertical acceleration (G) caused by gravity (see FIGS. 3 and 4) was not detected. The pump voltage $V_P(=V_{PS})$ of the piezoelectric pump 11 which set the gas flow $P_{FO}$ to 80 SCCM was 3 V.

Experiment has shown that this characteristic is affected only a little if the ambient temperature is varied and if the tilt angle of the gas rate sensor 1 is set to any desired angle.

As described in detail thus far in connection with the preferred embodiment of the invention, the present invention provides a gas rate sensor comprising a sensor body, a container in which the sensor body is housed, a detection means for detecting an angular velocity in the direction of yaw, and a pump control means for controlling operation of a piezoelectric pump to adjust the gas flow rate. The sensor body comprises semiconductor substrates on which a pair of heat-generating heat-sensitive resistive elements are formed by photoengraving techniques which are normally used in semiconductor fabrication processes. The heat-sensitive elements are mounted on a substrate bridge. The sensor body forms a pump casing in which a gas passageway is formed. A piezoelectric pump is mounted in the pump casing. A pressurized gas is sealed in the container. The pump control means acts to adjust the gas flow rate. The effects of vertical acceleration on the gas rate sensor are eliminated by adjusting the gas flow rate by controlling the operation of the piezoelectric pump. Only when an angular velocity is made to act on the sensor body in the direction of yaw is the gas flow deflected. The resulting variations in the resistances of the heat-sensitive elements are electrically detected. Thus, the angular velocity acting in the direction of yaw is detected with high accuracy.

Also, in the present invention, the detection means is equipped with a resistive bridge circuit made up of the pair of heat-generating heat-sensitive resistive elements and a pair of reference resistors. The angular velocity is detected as an output that represents the sum of amounts of change of resistances in the heat-sensitive elements which change in mutually opposite directions. Therefore, the angular velocity can be accurately determined from the absolute value of the output from the resistive bridge circuit. Also, the direction of action of the angular velocity can be determined from the polarity of the output.

We claim:

1. A gas rate sensor comprising:
   a sensor body having a pair of heat-generating and heat-sensitive resistive elements disposed in a gas passageway in an opposed relation to each other;
   a pump for creating a gas flow inside said gas passageway;
   a container for housing said resistive elements and said pump, said container having a pressurized gas sealed therein;
   detection means for producing an output signal in response to variations in resistances of said resistive elements caused by deflection of said gas flow upon an angular velocity acting on said sensor body; and
   pump control means for adjusting rate of said gas flow in such a way that said detection means produces a zero value of said output signal upon a gravitational acceleration corresponding to tilt of said sensor body in a direction of roll.

2. The gas rate sensor of claim 1, wherein said detection means comprises a resistive bridge circuit composed of said heat-generating and heat-sensitive resistive elements and a pair of resistors having reference resistances.

3. A gas rate sensor comprising:
   a sensor body having a pair of heat-generating and heat-sensitive resistive elements disposed in a gas passageway in an opposed relation to each other;
   a pump for creating a gas flow inside said gas passageway;
   a container for housing said resistive elements and said pump, said container having a pressurized gas sealed therein;
   detection means for producing an output signal in response to variations in resistances of said resistive elements caused by deflection of said gas flow upon an angular velocity acting on said sensor body; and
   pump control means for adjusting said gas flow in such a way that said detection means produces a zero value of said output signal upon a gravitational acceleration corresponding to tilt of said sensor body in a direction of roll,
   wherein said detection means comprises:
   a resistive bridge circuit composed of said heat-generating and heat-sensitive resistive elements and a pair of resistors having reference resistances;
   an angular velocity storage portion for storing angular velocity values corresponding to output values from said resistive bridge circuit; and
   an angular velocity conversion portion for converting the output from said resistive bridge circuit into a corresponding angular velocity.

4. The gas rate sensor of claim 3, wherein when a pressure of said pressurized gas is varied with varying ambient temperature said pump control means estimates the pressure of aid pressurized gas from said temperature variation and automatically sets said pump voltage which makes null said acceleration signal outputted from said detection means according to the estimated pressure.

5. The gas rate sensor of claim 3, wherein said pump control means stores a pump voltage that makes null said signal produced from said detection means in response to said pressurized gas on initial setting or resetting.

6. The gas rate sensor of claim 3, wherein said pump control means comprises:
   comparison means for comparing an acceleration signal produced from said detection means with a reference acceleration and for producing a difference signal;
   pump voltage setting means for storing voltage values for correcting a pump voltage corresponding to said difference signal for driving said pump; and
   pump voltage output means for outputting a voltage correcting value corresponding to said difference signal to said pump,
   and said pump control means controls the operation of said pump based on said voltage correcting value and automatically sets said pump voltage to such a value that said acceleration signal produced by said detection means becomes null on initial setting and resetting.

7. A gas rate sensor comprising:
   a sensor body having a pair of heat-generating and heat-sensitive resistive elements disposed in a gas passageway in an opposed relation to each other;
   a pump for creating a gas flow inside said gas passageway;
   a container for housing said resistive elements and said pump, said container having a pressurized gas sealed therein;
   detection means for producing an output signal in response to variations in resistances of said resistive elements caused by deflection of said gas flow upon an angular velocity acting on said sensor body; and
   pump control means for adjusting said gas flow in such a way that said detection means produces a zero value of said output signal upon a gravitational acceleration corresponding to tilt of said sensor body in a direction of roll,
   wherein said pump control means comprises:
   comparison means for comparing an acceleration signal produced from said detection means with a reference acceleration and for producing a difference signal;
   pump voltage setting means for storing voltage values for correcting a pump voltage corresponding to said difference signal for driving said pump; and
   pump voltage output means for outputting a voltage correcting value corresponding to said difference signal to said pump,
   and said pump control means controls the operation of said pump based on said voltage correcting value and automatically sets said pump voltage to such a value that said acceleration signal produced by said detection means becomes null on initial setting and resetting.

8. The gas rate sensor of claim 7, wherein said detection means comprises a resistive bridge circuit composed of said heat-generating and heat-sensitive resistive elements and a pair of resistors having reference resistances.

9. The gas rate sensor of claim 6 or 8 wherein said pump control means stores a pump voltage that makes null said signal produced from said detection means in response to said pressurized gas on initial setting or resetting.

10. The gas rate sensor of claim 7, wherein said pump control means stores a pump voltage that makes null said signal produced from said detection means in response to said pressurized gas on initial setting or resetting.

11. A gas rate sensor comprising:
    a sensor body having a gas passageway and a gas in said sensor body;
    a pump for creating a gas flow of said gas in said gas passageway;
    a pair of resistive elements disposed in said gas passageway for sensing a change in the direction of gas flow in said gas passageway;
    detection means for producing an output signal in response to variations in resistances of said resistive elements caused by said changes in direction of said gas flow; and pump control means for varying into of said gas flow to compensate for acceleration of said sensor body in directions other than as caused by a horizontal angular velocity for causing said detection means to produce a zero value of said output signal upon acceleration in said other directions.

12. A gas rate sensor comprising:

a sensor body having a gas passageway and a gas in said sensor body;

a pump for creating a gas flow of said gas in said gas passageway;

a pair of resistive elements disposed in said gas passageway for sensing a change in the direction of gas flow in said gas passageway;

detection means for producing an output signal in response to variations in resistances of said resistive elements caused by said changes in direction of said gas flow; and pump control means for varying said gas flow to compensate for acceleration of said sensor body in directions other than as caused by a horizontal angular velocity for causing said detection means to produce a zero value of said output signal upon acceleration in said other directions, wherein said pair of resistive elements are horizontally spaced from each other on opposite sides of said gas passageway.

13. A gas rate sensor comprising:

a sensor body having a gas passageway and a gas in said sensor body;

a pump for creating a gas flow of said gas in said gas passageway;

a pair of resistive elements disposed in said gas passageway for sensing a change in the direction of gas flow in said gas passageway;

detection means for producing an output signal in response to variations in resistances of said resistive elements caused by said changes in direction of said gas flow; and pump control means for varying said gas flow to compensate for acceleration of said sensor body in directions other than as caused by a horizontal angular velocity for causing said detection means to produce a zero value of said output signal upon acceleration in said other directions, wherein said pump control means is set to produce a gas flow rate for causing said zero value of said output signal by said detection means by positioning said sensor body tilted at an angle to horizontal from a normal operation position of said sensor body and, while said sensor body is at rest, varying said gas flow to produce a zero value of said output signal.

14. The gas rate sensor of claim 13 wherein said body is tilted 90° from said normal operation position.

15. The gas rate sensor of claim 13 wherein said pair of resistive elements are horizontally spaced from each other on opposite sides of said gas passageway.

16. A gas rate sensor comprising:

a sensor body having a pair of heat-generating and heat-sensitive resistive elements disposed in a gas passageway in an opposed relation to each other;

a pump for creating a gas flow inside said gas passageway;

a container for housing said resistive elements and said pump, said container having a pressurized gas sealed therein;

detection means for producing an output signal in response to variations in resistances of said resistive elements caused by deflection of said gas flow upon an angular velocity acting on said sensor body; and pump control means for adjusting said gas flow in such a way that said detection means produces a zero value of said output signal upon a gravitational acceleration corresponding to tilt of said sensor body in a direction of roll, wherein said pump control means stores a pump voltage that makes null said signal produced from said detection means in response to said pressurized gas on initial setting or resetting.

17. A gas rate sensor comprising:

a sensor body having a pair of heat-generating and heat-sensitive resistive elements disposed in a gas passageway in an opposed relation to each other;

a pump for creating a gas flow inside said gas passageway;

a container for housing said resistive elements and said pump, said container having a pressurized gas sealed therein;

detection means for producing an output signal in response to variations in resistances of said resistive elements caused by deflection of said gas flow upon an angular velocity acting on said sensor body; and pump control means for adjusting said gas flow in such a way that said detection means produces a zero value of said output signal upon a gravitational acceleration corresponding to tilt of said sensor body in a direction of roll, wherein when a pressure of said pressurized gas is varied with varying ambient temperature said pump control means estimates the pressure of said pressurized gas from said temperature variation and automatically sets said pump voltage which makes null said acceleration signal outputted from said detection means according to the estimated pressure.

18. The gas rate sensor of claim 16 or 17, wherein said detection means comprises a resistive bridge circuit composed of said heat-generating and heat-sensitive resistive elements and a pair of resistors having reference resistances.

* * * * *